Sept. 28, 1926.                    G. BRENNER                    1,600,972
                                HANDLE BAR DEVICE
                              Filed March 2, 1925                2 Sheets-Sheet 2

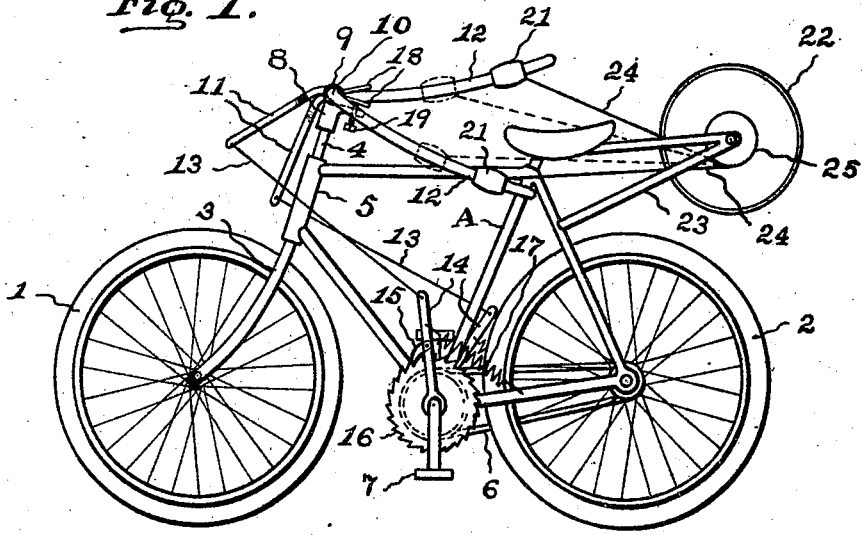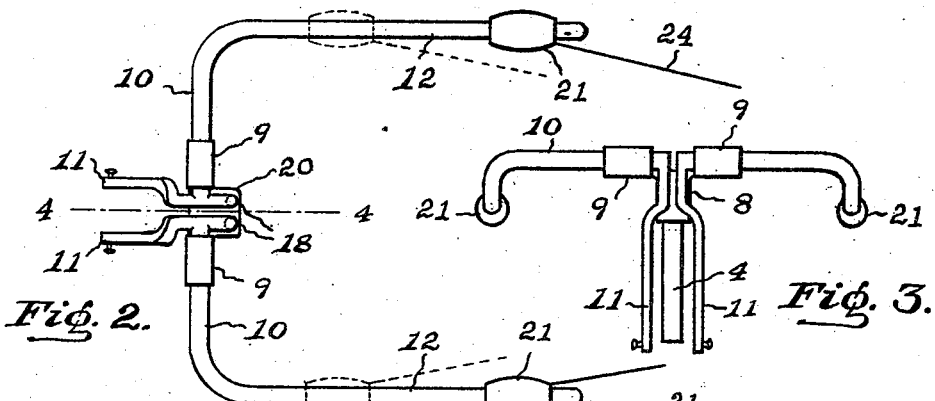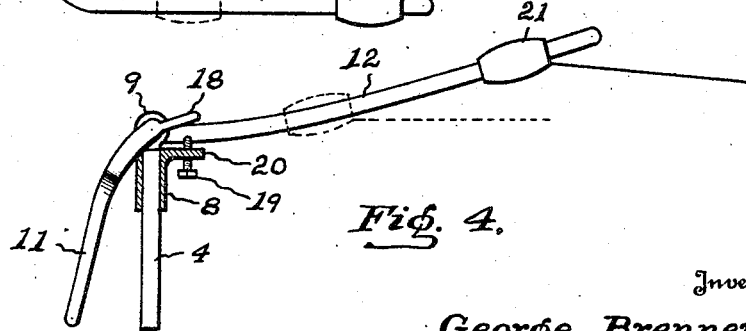

INVENTOR.
George Brenner
BY
ATTORNEYS

Patented Sept. 28, 1926.

1,600,972

UNITED STATES PATENT OFFICE.

GEORGE BRENNER, OF CLEVELAND, OHIO.

HANDLE-BAR DEVICE.

Application filed March 2, 1925. Serial No. 12,567.

The present invention relates to certain new and useful improvements in advertising or display devices of that type which are adapted to be used on bicycles or the like, and among the objects of the invention are to provide a handle bar device which embodies novel features of construction whereby it can be readily manipulated to actuate the display device without interfering with the use thereof for steering the bicycle, or as an auxiliary source of power when the latter is desired.

One particular embodiment of the invention will be shown and described in detail for illustrative purposes, although it will be understood that many modifications and changes can be made in the various details of construction within the scope of the appended claims and without departing from the spirit of the invention.

For a full understanding of the invention reference is to be had to the following description and accompanying drawings, in which—

Figure 1 is a side elevation of a bicycle which is provided with a handle bar device constructed in accordance with the invention.

Figure 2 is a plan view of the handle bars, showing the same as detached from the bicycle, the hand holds being shown in one position by full lines and in another position by dotted lines.

Figure 3 is a front elevation of the handle bars.

Figure 4 is a sectional view on the line 4—4 of Figure 2.

Corresponding and like parts are referred to in the following description and indicated on all of the views of the drawings by like reference characters.

Figure 5:
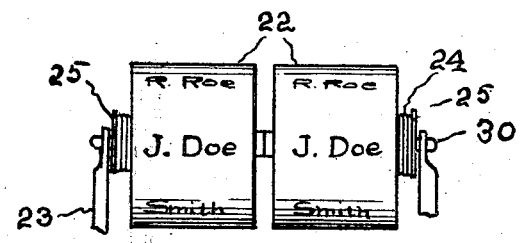
Figure 5 is a rear view of the display device.
Figure 6:
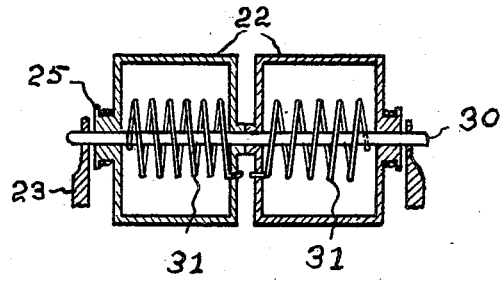
Figure 6 is a longitudinal sectional view through the same, showing the springs which are used to actuate the drums.

Referring to the drawings, which illustrate one of many possible embodiments of the invention, the reference character A designates the main frame of a bicycle which is provided with the usual front wheel 1 and rear wheel 2. The front wheel is journaled in a conventional fork 3 having a steering shaft 4 at the upper end thereof, said shaft being received within the usual upright tubular portion 5 at the front of the main frame 1. The rear wheel 2 has a chain and sprocket connection 6 with a sprocket shaft which is provided with the usual pedals 7. The foregoing is the conventional construction of practically all bicycles and no claim to novelty is based thereon.

The upper end of the steering shaft 4 has a T-shaped steering head rigidly applied thereto, said head including an upright sleeve 8 which is secured to the steering shaft 4, and a pair of laterally projecting bearing sleeves 9 within which the handle bar sections 10 are journaled. The bearing sleeves 9 are arranged in substantial alignment with each other and have the inner ends thereof spaced apart. The handle bar sections 10 are journaled in the respective sleeves 9 so that they can be rotated therein independently of each other, the inner ends of the handle bar section which extend into the space between the bearing sleeves being provided with the downwardly and forwardly extending arms 11, while the outer ends of the handle bar sections are provided with the rearwardly extending hand levers 12.

The arms 11 are connected by flexible elements such as the wires or cables 13 to ratchet levers 14 which are journaled on the sprocket shaft of the bicycle, said ratchet levers being provided with pawls 15 which are adapted to cooperate with the teeth of ratchet wheels 16 to rotate the ratchet wheels when the levers are moved forwardly, the pawls slipping idly over the teeth of the ratchet wheels when the levers are moved rearwardly. The ratchet wheels 16 are rigid with the shaft of the pedals 7, and tension springs 17 are connected to the levers 14 and normally tend to pull the said levers rearwardly. These levers 14 are also connected by the flexible wires 13 to the arms 11 of the handle bar sections. The flexibility of the cables 13 prevents the device from interfering with the steering of the bicycle, and it will be obvious that by working the hand levers 12 up and down the device can be used as an auxiliary source of power for propelling the bicycle. When it is not desired to use the handle bars as a source of power the hand levers 12 thereof can be held in any position and in propelling the bicycle with the pedals 7 the ratchet wheels 16 will rotate freely, the pawls 15 merely slipping over the inclined faces of the teeth thereof without interfering at all with the rotation of the ratchet wheels.

The handle bar sections 10 are provided at the inner ends thereof with rearwardly projecting stop arms 18, which are adapted to engage stop screws 19 to limit the downward swinging movements of the hand levers 12 and provide a rest for the hand levers when the latter are swung downwardly to the lower limit of their movement. The stop screws are threaded in a bracket 20 which project rearwardly from the T-shaped steering head at the top of the upright sleeve 8, and these screws can be adjusted so that they will limit the downward swinging movements of the respective hand levers at the desired positions. The rider can thus adjust the screws so that the hand levers are stopped in their downward movements in the position at which it may be desired to use the same as rests when riding the bicycle in the usual manner without using the handle bar device as a source of auxiliary power.

Slidably mounted upon the respective hand levers 12 are hand holds 21 which can be moved freely back and forth on the levers in order to obtain greater or less leverage, as may be desired, when using the hand levers as an auxiliary source of power for propelling the bicycle. This sliding movement of the hand holds 21 may also be utilized to actuate a movable display device such as spring actuated rotating drums 22. These drums 22 are journaled on a shaft 30 which connects the arms of a bifurcated bracket 23, and a conventional form of spring 31 is arranged within each of the drums, one end of each of the springs being connected to the shaft, while the other end thereof is connected to the corresponding drum. A flexible cord 24 connects each of the hand holds to a spool 25 which is rigid with the corresponding drum and when the hand hold is moved forwardly on the hand lever the cord 24 is unwound from the spool 25 to rotate the drum against the action of its spring 31. It will accordingly be obvious that when the hand hold is moved rearwardly the drum will be reversely rotated by the energy previously stored in the spring and the flexible cord wound up on the spool. Any suitable form of advertising matter may be placed on the periphery of the drums and it will be obvious that the rotation of the drums will attract attention to this advertising matter by imparting movements thereto. Any other form of advertising or display device may be operatively connected to the hand holds so that movement can be imparted thereto by sliding the hand holds on the hand levers. The arms 11 which project downwardly from the inner ends of the handle bar sections may be provided with suitable offset portions so that the lower ends thereof will be separated from each other and the cables 13 held away from the upright sleeve 8.

Having thus described my invention what I claim as new and desire to secure by Letters Patent is,

1. The combination with a bicycle including a steering mechanism, a hand hold movably mounted thereon, a movable display, and an operative connection between the hand hold and the movable display.

2. The combination with a bicycle including a steering mechanism, a hand hold slidably mounted upon a part thereof, a movable display, and an operative connection between the hand hold and the movable display.

3. The combination with a bicycle, a hand hold movably mounted upon a part of the bicycle, a movable display mounted on the bicycle, and an operative connection between the hand hold and the movable display.

4. The combination with a bicycle, of a movable display thereon, a handle bar provided with a movable element, and an operative connection between the movable element of the handle bar and the movable display.

5. The combination with a bicycle, of a movable display thereon, a handle bar, a hand hold adjustably mounted on the handle bar, and an operative connection between the hand hold and the movable display.

6. The combination with a bicycle, of a movably mounted display device thereon, a handle bar, a hand hold mounted to slide freely thereon, and an operative connection between the hand hold and the movably mounted display device.

In testimony whereof I affix my signature.

GEORGE BRENNER.